United States Patent
Park et al.

(10) Patent No.: US 9,538,410 B2
(45) Date of Patent: Jan. 3, 2017

(54) METHOD FOR TRANSMITTING OR RECEIVING UPLINK SIGNAL

(71) Applicant: LG ELECTRONICS INC., Seoul (KR)

(72) Inventors: Jonghyun Park, Anyang-si (KR); Hakseong Kim, Anyang-si (KR); Suckchel Yang, Anyang-si (KR); Hanbyul Seo, Anyang-si (KR); Kijun Kim, Anyang-si (KR); Byounghoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 108 days.

(21) Appl. No.: 14/382,501

(22) PCT Filed: Mar. 20, 2013

(86) PCT No.: PCT/KR2013/002281
§ 371 (c)(1),
(2) Date: Sep. 2, 2014

(87) PCT Pub. No.: WO2013/141595
PCT Pub. Date: Sep. 26, 2013

(65) Prior Publication Data
US 2015/0055518 A1 Feb. 26, 2015

Related U.S. Application Data

(60) Provisional application No. 61/614,500, filed on Mar. 22, 2012, provisional application No. 61/616,413, filed on Mar. 27, 2012.

(51) Int. Cl.
*H04J 3/00* (2006.01)
*H04W 24/10* (2009.01)
(Continued)

(52) U.S. Cl.
CPC .......... *H04W 24/10* (2013.01); *H04B 7/2643* (2013.01); *H04L 5/0048* (2013.01); *H04L 5/14* (2013.01); *H04W 52/146* (2013.01)

(58) Field of Classification Search
CPC ............ H04L 5/14; H04L 5/1423; H04L 5/16; H04Q 11/04
See application file for complete search history.

(56) References Cited

U.S. PATENT DOCUMENTS

2006/0040619 A1* 2/2006 Cho ...................... H04W 52/08
455/69
2006/0250963 A1* 11/2006 Jin .................... H04W 72/0413
370/236

(Continued)

OTHER PUBLICATIONS

Alcatel-Lucent, Aldatel-Lucent Shanghai Bell, "SRS Power Control for UL CoMP,"—3GPP TSG RAN WG1 meeting #68, Dresden, Germany, Feb. 6-10, 2012, RI 120503 (2 pages).

(Continued)

*Primary Examiner* — Marcus R Smith
*Assistant Examiner* — Siren Wei
(74) *Attorney, Agent, or Firm* — Birch, Stewart, Kolasch & Birch, LLP

(57) ABSTRACT

The present invention relates to a method for user equipment transmitting an uplink signal in a time division duplex (TDD) wireless communication system, according to one embodiment. The method comprises: detecting a downlink control signal; and transmitting the uplink signal on the basis of uplink-related control information which is included in the downlink control signal that is detected, wherein a transmission power value is reported on the basis of an indicator, which indicates reporting of the transmission power value of the uplink signal at a specific time.

20 Claims, 5 Drawing Sheets

(51) Int. Cl.
*H04B 7/26* (2006.01)
*H04L 5/00* (2006.01)
*H04L 5/14* (2006.01)
*H04W 52/14* (2009.01)

(56) References Cited

U.S. PATENT DOCUMENTS

| | | | |
|---|---|---|---|
| 2007/0168326 A1* | 7/2007 | Das | H04L 1/0006 |
| 2010/0298016 A1* | 11/2010 | Madan | H04J 11/0053 |
| | | | 455/501 |
| 2011/0211522 A1* | 9/2011 | Chung | H04L 1/1822 |
| | | | 370/315 |
| 2011/0228722 A1* | 9/2011 | Noh | H04L 27/2605 |
| | | | 370/315 |
| 2013/0089034 A1* | 4/2013 | Acharya | H04W 48/20 |
| | | | 370/329 |

OTHER PUBLICATIONS

Huawei, et al., "Enhancements of SRS for UL CoMP"—3GPP TSG RAN WG1 meeting #68, Dresden, Germany, Feb. 6-10, 2012, RI 120039, (3 pages).

LG Electronics, "SRS Enhancements for CoMP in Rel-11," 3GPP TSG RAN WG1 meeting #68, Dresden, Germany, Feb. 6-10, 2012,—RI 120443 (3 pages, figure 1).

Qualcomm Incorporated, "SRS Enhancements in Support of Uplink CoMP," 3GPP TSG RAN WG1 meeting #68, Dresden, Germany, Feb. 6-10, 2012, RI 120555 (4 pages).

Samsung, "SRS Transmission Control," 3GPP TSG RAN WG1 meeting #68, Dresden, Germany, Feb. 6-10, 2012, RI 120180 (3 pages, figure 1).

* cited by examiner

METHOD FOR TRANSMITTING OR RECEIVING UPLINK SIGNAL

CROSS REFERENCE TO RELATED APPLICATIONS

This application is the National Phase of PCT/KR2013/002281 filed on Mar. 20, 2013, which claims priority under 35 U.S.C. 119(e) to U.S. Provisional Application No. 61/614,500 filed on Mar. 22, 2012 and U.S. Provisional Application No. 61/616,413 filed on Mar. 27, 2012, all of which are hereby expressly incorporated by reference into the present application.

FIELD OF THE INVENTION

The present invention relates to a wireless communication system, and more particularly to a method and apparatus for transmitting or receiving an uplink signal.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology that efficiently uses more frequency bands, cognitive ratio technology, multiple input multiple output (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, a node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which plural nodes communicate with a user equipment (UE) using the same time-frequency resources has much higher data throughput than legacy communication schemes in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered a kind of Multiple Input Multiple Output (MIMO) system since dispersed nodes can communicate with a single UE or multiple UEs by simultaneously transmitting/receiving different data streams. However, since the multi-node system transmits signals using dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease pathloss and enable rapid data transmission in a multi-node system. This can improve transmission capacity and power efficiency of a cellular system and provide communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces conventional centralized antenna systems, becoming the foundation of a new form of cellular communication in order to reduce base station cost and backhaul network maintenance cost while extending service coverage and improving channel capacity and SINR in next-generation mobile communication systems.

DETAILED DESCRIPTION OF THE INVENTION

Technical Problem

An object of the present invention is to provide a method for informing an eNB of a transmit (Tx) power value regarding an uplink signal of a user equipment (UE).

Another object of the present invention is to provide a method for operating the user equipment (UE) in a wireless communication environment in which a downlink (DL) point and an uplink (UL) point of the UE are different from each other.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting uplink signal by a user equipment (UE) in a Time Division Duplex (TDD) wireless communication system including: detecting downlink control signal, transmitting uplink signal based on uplink-associated control information contained in the detected downlink control signal, and reporting a transmission (Tx) power value based on an indicator indicating reporting of the Tx power value of the uplink signal at a specific time.

Additionally or alternatively, the Tx power value of the uplink signal of the specific time may be transmitted at the same uplink subframe as the uplink signal of the specific time is transmitted.

Additionally or alternatively, the downlink control signal and the indicator may be received from a serving cell or another cell instead of the serving cell.

Additionally or alternatively, the Tx power value may be reported to the serving cell or another cell instead of the serving cell.

Additionally or alternatively, the uplink signal may be a sounding reference signal (SRS).

In accordance with another aspect of the present invention, a method for receiving an uplink signal in a Time Division Duplex (TDD) wireless communication system includes: transmitting uplink-associated control information to a user equipment (UE) through a downlink control signal, receiving an uplink signal based on the uplink-associated control information from the UE, transmitting an indicator indicating reporting of a transmission (Tx) power value of the uplink signal of a specific time to the UE, and receiving the Tx power value triggered by the indicator.

Additionally or alternatively, the Tx power value of the uplink signal of the specific time may be received at the same uplink subframe as the uplink signal of the specific time is received.

Additionally or alternatively, the method may further include: measuring a downlink channel gain using the received Tx power value.

Additionally or alternatively, the method may further include: transmitting the received Tx power value to another cell.

Additionally or alternatively, the uplink signal may be a sounding reference signal (SRS).

In accordance with another aspect of the present invention, a user equipment (UE) device configured to transmit an uplink signal in a Time Division Duplex (TDD) wireless communication system includes: a radio frequency (RF) unit; and a processor configured to control the RF unit, wherein the processor is configured to detect downlink control signal, transmit uplink signal based on uplink-associated control information contained in the detected downlink control signal, reporting a transmission (Tx) power value based on an indicator indicating reporting of the Tx power value of the uplink signal at a specific time.

Additionally or alternatively, the Tx power value of the uplink signal of the specific time may be transmitted at the same uplink subframe as the uplink signal of the specific time is transmitted.

Additionally or alternatively, the downlink control signal and the indicator may be received from a serving cell or another cell instead of the serving cell.

Additionally or alternatively, the Tx power value may be reported to the serving cell or another cell instead of the serving cell.

Additionally or alternatively, the uplink signal may be a sounding reference signal (SRS).

In accordance with another aspect of the present invention, a base station (BS) device configured to receive an uplink signal in a Time Division Duplex (TDD) wireless communication system includes: a radio frequency (RF) unit; and a processor configured to control the RF unit, wherein the processor is configured to transmit uplink-associated control information to a user equipment (UE) through a downlink control signal, receive uplink signal based on the uplink-associated control information from the UE, transmitting an indicator indicating reporting of a transmission (Tx) power value of the uplink signal of a specific time to the UE, and receiving the Tx power value triggered by the indicator.

Additionally or alternatively, the Tx power value of the uplink signal of the specific time may be received at the same uplink subframe as the uplink signal of the specific time is received.

Additionally or alternatively, the processor may be configured to measure a downlink channel gain using the received Tx power value.

Additionally or alternatively, the processor may be configured to transmit the received Tx power value to another cell.

Additionally or alternatively, the uplink signal may be a sounding reference signal (SRS).

It is to be understood that both the foregoing general description and the following detailed description of the present invention are exemplary and explanatory and are intended to provide further explanation of the invention as claimed.

Effects of the Invention

As is apparent from the above description, the embodiments of the present invention can estimate a channel state using a Tx power value of a UL signal.

Other embodiments of the present invention can save or reduce the amount of various resources consumed to estimate channel status information (CSI) or a UE channel.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Figure 1:
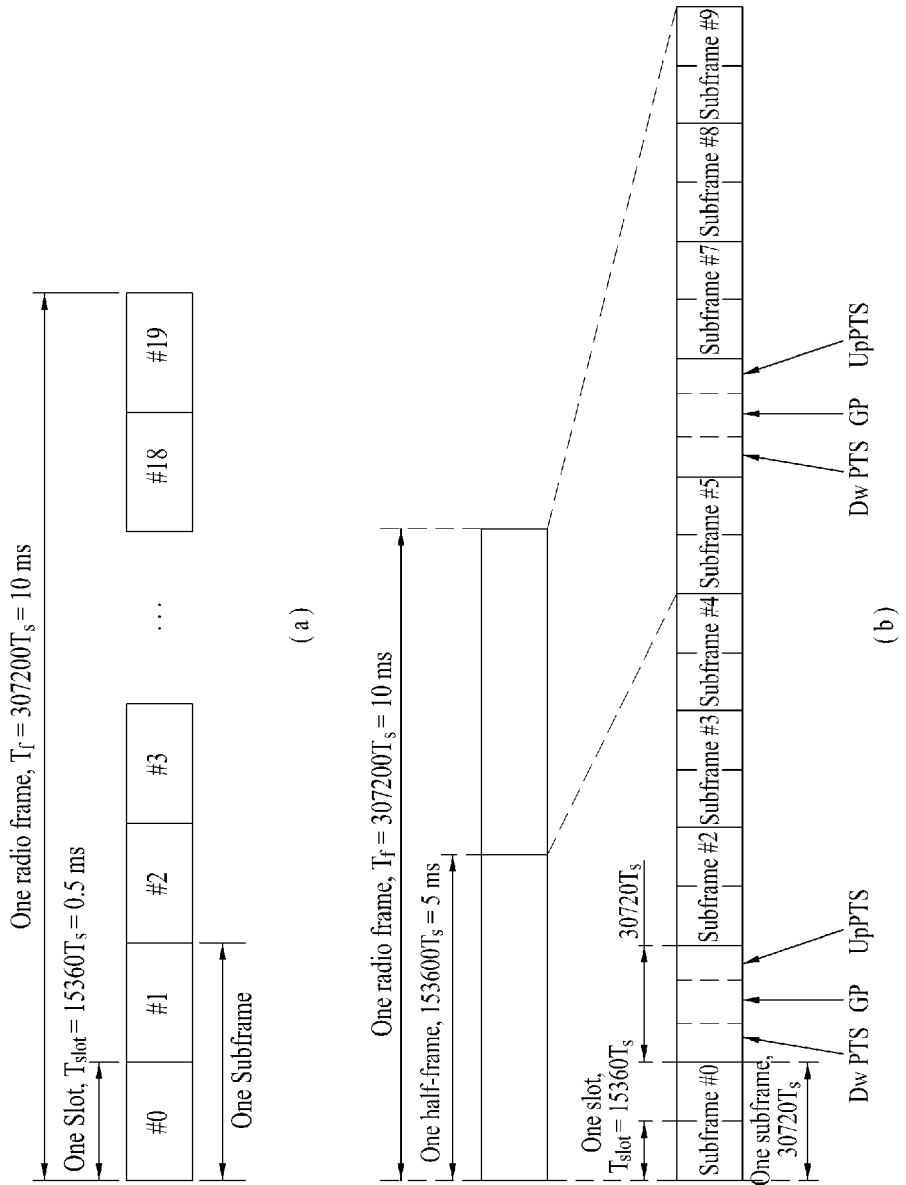
FIG. 1 exemplarily shows a radio frame structure for use in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

Also, technique, device, system, which will be described hereinafter, may be applied to various wireless multiplexing access systems. For convenience of description, it is assumed that the present invention is applied to a 3GPP LTE(-A). However, it is to be understood that technical features of the present invention are limited to the 3GPP LTE(-A). For example, although the following description will be made based on a mobile communication system corresponding to a 3GPP LTE(-A) system, the following description may be applied to other random mobile communication system except matters specific to the 3GPP LTE(-A).

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

Also, in the present invention, Cell-specific Reference Signal (CRS)/Demodulation Reference Signal (DMRS)/Channel State Information Reference Signal (CSI-RS) time-frequency resources (or REs) respectively mean REs that may be allocated or used for CRS/DMRS/CSI-RS, or time-frequency resources (or REs) carrying CRS/DMRS/CSI-RS. Also, subcarriers that include CRS/DMRS/CSI-RS RE may be referred to as CRS/DMRS/CSI-RS subcarriers, and OFDM symbols that include CRS/DMRS/CSI-RS RE may be referred to as CRS/DMRS/CSI-RS symbols. Also, in the present invention, SRS time-frequency resources (or REs) may mean time-frequency resources (or REs) transmitted from the user equipment to the base station to allow the base station to carry a sounding reference signal (SRS) used for measurement of an uplink channel status formed between the user equipment and the base station. The reference signal (RS) means a signal of a special waveform previously defined and known well by the user equipment and the base station, and may be referred to as a pilot.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

TABLE 1-continued

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

Figure 2:
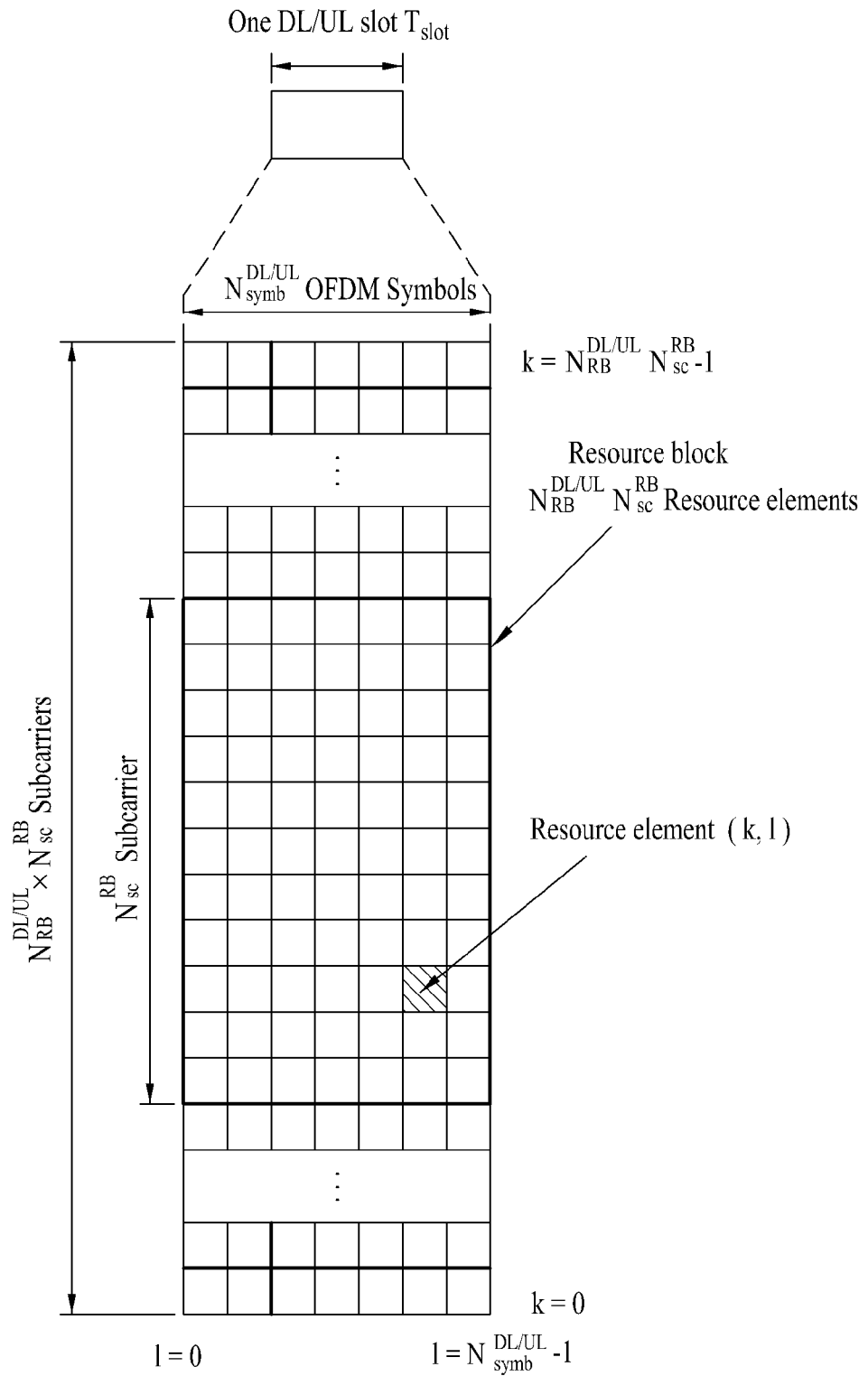
FIG. 2 exemplarily shows a downlink/uplink (DL/UL) slot structure for use in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{sumb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB} = n_{VRB}$ is obtained. Numbers are given to the localized VRBs from 0 to N and $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
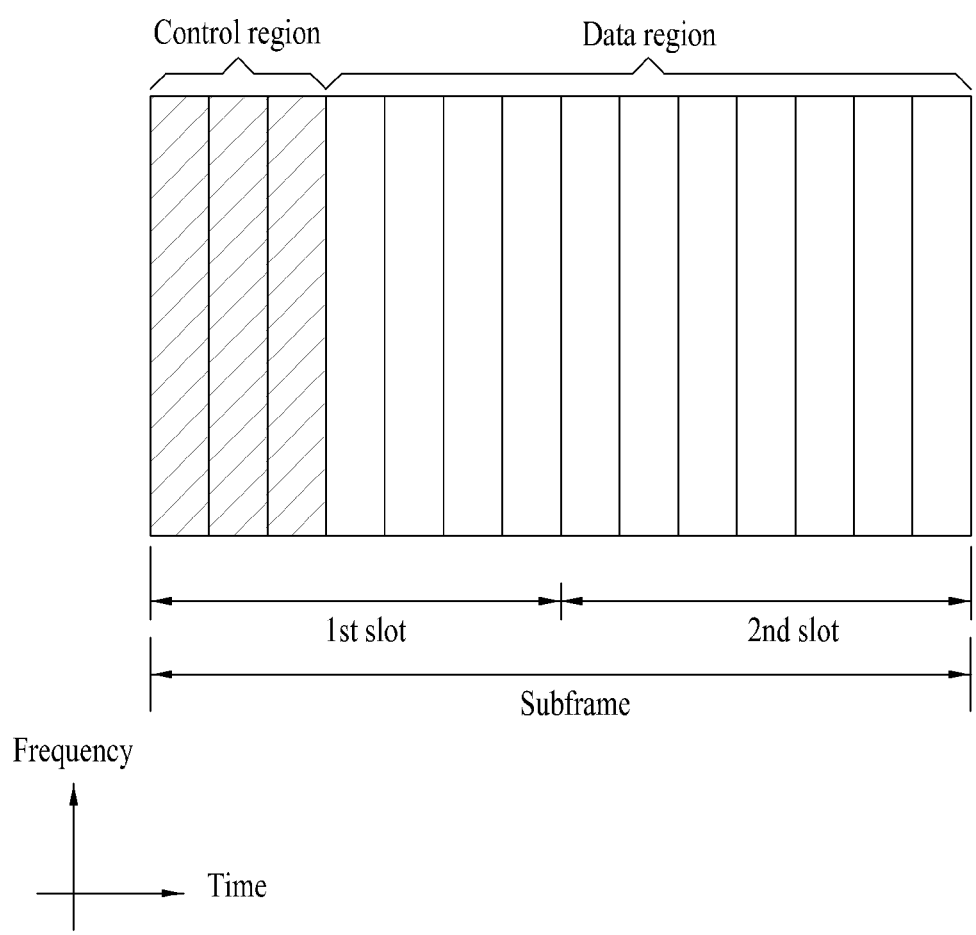
FIG. 3 exemplarily shows a downlink (DL) subframe structure for use in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked with an identifier (e.g., a Radio Network Temporary Identifier (RNTI)) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to nine REGs and one REG corresponds to four REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (that is, a PCFICH and a PHICH). A DCI format and the number of DCI bits are determined according to the number of CCEs.

CCEs are numbered and consecutively used and, in order to simplify decoding, a PDCCH having a format composed of n CCEs may start from only a CCE having a number corresponding to a multiple of n. The number of CCEs used to transmit a specific PDCCH, that is, a CCE aggregation level, is determined by a BS according to a channel state. For example, in case of a PDCCH for a UE having a good DL channel (e.g., a UE adjacent to a BS), one CCE may be sufficient. However, in case of a PDCCH for a UE having a bad channel (e.g., a UE located at a cell edge), 8 CCEs are required to obtain sufficient robustness.

Figure 4:
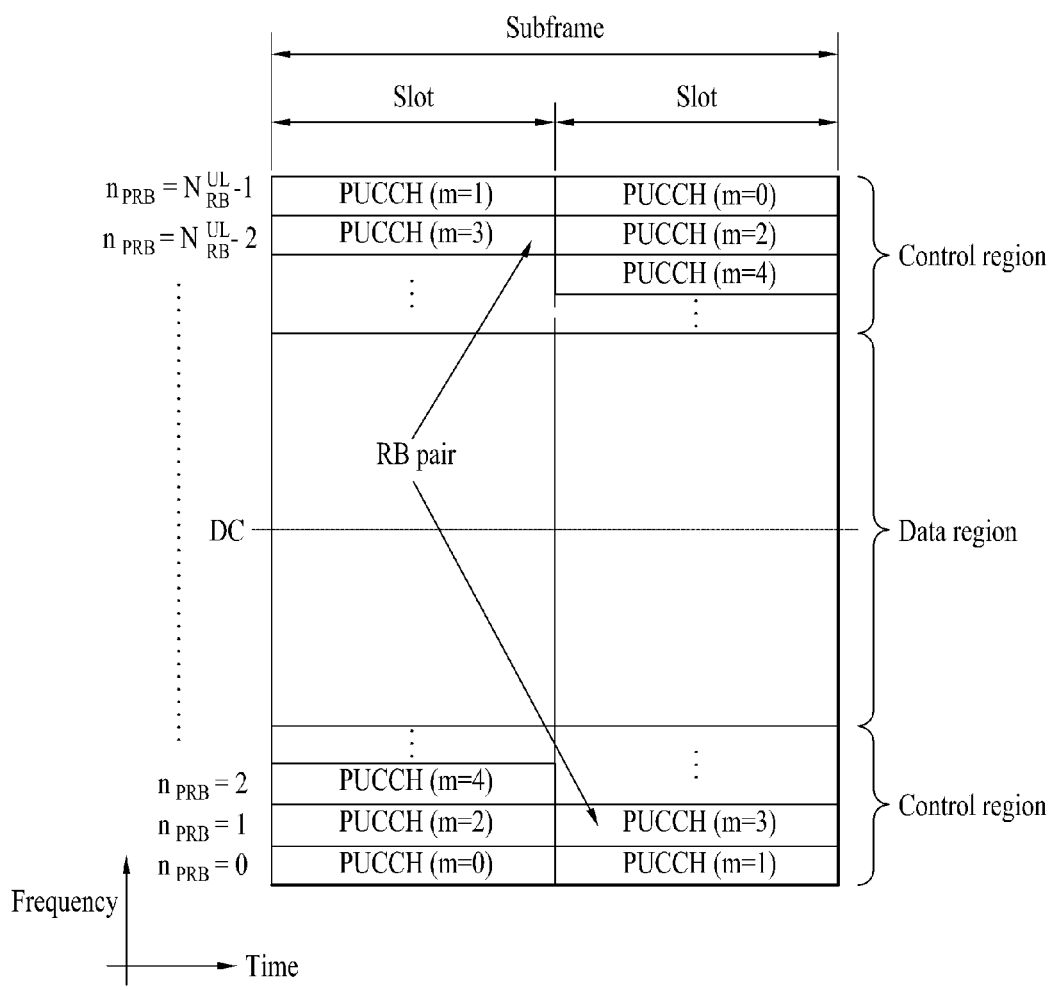
FIG. 4 exemplarily shows an uplink (UL) subframe for use in a 3GPP LTE/LTE-A system.

FIG. 4 illustrates an exemplary uplink subframe structure used in 3GPP LTE/LTE-A.

Referring to FIG. 4, a UL subframe may be divided into a control region and a data region in a frequency domain. One or several physical uplink control channels (PUCCHs) may be allocated to the control region in order to carry uplink control information (UCI). One or several physical uplink shared channels (PUSCHs) may be allocated to the data region of the UL subframe in order to carry user data.

The control region and the data region in the UL subframe are also referred to as a PUCCH region and a PUSCH region, respectively. A sounding reference signal (SRS) may be allocated to the data region. The SRS is transmitted on a last OFDM symbol of a UL subframe in a time domain and is transmitted on a data transmission band, that is, a data region, of the UL subframe. SRSs of several UEs, which are transmitted/received on the last OFDM symbol of the same subframe, are distinguished according to frequency location/sequence.

If a UE employs an SC-FDMA scheme in UL transmission, in order to maintain a single carrier property, in a 3GPP LTE release-8 or release-9 system, a PUCCH and a PUSCH may not be simultaneously transmitted on one carrier. In a 3GPP LTE release-10 system, support of simultaneous transmission of a PUCCH and a PUSCH may be indicated by a higher layer.

In a UL subframe, subcarriers distant from a direct current (DC) subcarrier are used as the control region. In other words, subcarriers located at both ends of a UL transmission bandwidth are used to transmit uplink control information. A DC subcarrier is a component which is not used to transmit a signal and is mapped to a carrier frequency f0 in a frequency up-conversion process. A PUCCH for one UE is allocated to an RB pair belonging to resources operating in one carrier frequency and RBs belonging to the RB pair occupy different subcarriers in two slots. The allocated PUCCH is expressed by frequency hopping of the RB pair allocated to the PUCCH at a slot boundary. If frequency hopping is not applied, the RB pair occupies the same subcarrier.

The size and usage of UCI carried by one PUCCH may be changed according to PUCCH format and the size of the UCI may be changed according to a coding rate. For example, the following PUCCH format may be defined.

TABLE 2

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

Meanwhile, in an LTE-A system which includes more accurate MU-MIMO and explicit CoMP operations, current CSI feedback is defined in LTE and thus may not sufficiently support operations to be newly introduced. As requirements for CSI feedback accuracy become more complex in order to obtain sufficient MU-MIMO or CoMP throughput gain, the PMI is composed of two PMIs such as a long term/wideband PMI (W1) and a short term/subband PMI (W2). In other words, a final PMI is expressed by a function of W1 and W2. For example, the final PMI W may be defined as follows: W=W1*W2 or W=W2*W1. Accordingly, in LTE-A, a CSI may be composed of RI, W1, W2 and CQI.

In the 3GPP LTE(-A) system, an uplink channel used for CSI transmission is shown in Table 3 below.

TABLE 3

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 3, the CSI may be transmitted using a physical uplink control channel (PUCCH) with periodicity determined by a higher layer or may be aperiodically transmitted using a physical uplink shared channel (PUSCH) according to the demand of a scheduler. If the CSI is transmitted using the PUSCH, only frequency selective scheduling method and an aperiodic CSI transmission method are possible. Hereinafter, the scheduling scheme and a CSI transmission scheme according to periodicity will be described.

1) CQI/PMI/RI Transmission Via PUSCH after Receiving CSI Transmission Request Control Signal.

A control signal for requesting transmission of a CSI may be included in a PUSCH scheduling control signal (UL grant) transmitted via a PDCCH signal. Table 4 below shows the mode of the UE when the CQI, the PMI and the RI are transmitted via the PUSCH.

TABLE 4

| | | PMI Feedback Type | | |
|---|---|---|---|---|
| | | No PMI | Single PMI | Multiple PMIs |
| PUSCH CQI Feedback Type | Wideband (Wideband CQI) | | | Mode 1-2 |
| | UE selected (Subband CQI) | Mode 2-0 | | Mode 2-2 |
| | Higher Layer-configured (Subband CQI) | Mode 3-0 | Mode 3-1 | |

The transmission mode of Table 4 is selected at a higher layer and the CQI/PMI/RI is transmitted in the same PUSCH subframe. Hereinafter, an uplink transmission method of the UE according to mode will be described.

Mode 1-2 indicates the case in which a precoding matrix is selected on the assumption that data is transmitted via only a subband with respect to each subband. The UE generates a CQI on the assumption that a precoding matrix is selected with respect to an entire set S specified by a higher layer or a system bandwidth. In Mode 1-2, the UE may transmit the CQI and the PMI value of each subband. At this time, the size of each subband may be changed according to system bandwidth.

In mode 2-0, the UE may select M preferred subbands with respect to the set S specified at the higher layer or the system bandwidth. The UE may generate one CQI value on the assumption that data is transmitted with respect to the selected M subbands. The UE preferably reports one CQI (wideband CQI) value with respect to the set S or the system bandwidth. The UE defines the CQI value of each codeword in the form of a difference if a plurality of codewords is present with respect to the selected M subbands.

At this time, the differential CQI value is determined by a difference between an index corresponding to the CQI value of the selected M subbands and a wideband CQI (WB-CQI) index.

In Mode 2-0, the UE may transmit a CQI value generated with respect to a specified set S or an entire set and one CQI value for the selected M subbands to the BS. At this time, the size of the subband and the M value may be changed according to system bandwidth.

In Mode 2-2, the UE may simultaneously select the locations of M preferred subbands and a single precoding matrix for the M preferred subbands on the assumption that data is transmitted via the M preferred subbands. At this time, the CQI value for the M preferred subbands is defined per codeword. In addition, the UE further generates a wideband CQI value with respect to the specified set S or the system bandwidth.

In Mode 2-2, the UE may transmit information about the locations of the M preferred subbands, one CQI value for the selected M subbands, a single PMI for the M preferred subbands, a wideband PMI and a wideband CQI value to the BS. At this time, the size of the subband and the M value may be changed according to system bandwidth.

In Mode 3-0, the UE generates a wideband CQI value. The UE generates the CQI value for each subband on the assumption that data is transmitted via each subband. At this time, even in case of RI>1, the CQI value indicates only the CQI value for a first codeword.

In Mode 3-1, the UE generates a single precoding matrix with respect to the specified set S or the system bandwidth. The UE generates a subband CQI on a per codeword basis on the assumption of the single precoding matrix generated with respect to each subband. In addition, the UE may generate a wideband CQI on the assumption of a single precoding matrix. The CQI value of each subband may be expressed in the form of a difference. The subband CQI value is calculated by a difference between a subband CQI index and a wideband CQI index. At this time, the size of the subband may be changed according to system bandwidth.

2) Periodic CQI/PMI/RI Transmission Via PUCCH

The UE may periodically transmit the CSI (e.g., CQI/PMI/RI information) to the BS via the PUCCH. If the UE receives a control signal for requesting transmission of user data, the UE may transmit the CQI via the PUCCH. Even when the control signal is transmitted via the PUSCH, the CQI/PMI/RI may be transmitted using one of the modes defined in Table 5 below.

TABLE 5

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selection (subband CQI) | Mode 2-0 | Mode 2-1 |

The UE may have the transmission modes shown in Table 5. Referring to Table 5, in Mode 2-0 and Mode 2-1, a bandwidth (BP) part is a set of subbands continuously located in a frequency domain and may cover a system bandwidth or a specified set S. In Table 5, the size of each subband, the size of the BP and the number of BPs may be changed according to system bandwidth. In addition, the UE transmits the CQI in a frequency domain in ascending order per BP so as to cover the system bandwidth or the specified set S.

According to a transmission combination of the CQI/PMI/RI, the UE may have the following four transmission types.
  i) Type 1: A subband CQI (SB-CQI) of Mode 2-0 and Mode 2-1 is transmitted.
  ii) Type 2: A wideband CQI and a PMI (WB-CQI/PMI) are transmitted.
  iii) Type 3: An RI is transmitted.
  iv) Type 4: A wideband CQI is transmitted.

If the UE transmits the RI and the wideband CQI/PMI, the CQI/PMI is transmitted in subframes having different offsets and periodicities. In addition, if the RI and the wideband CQI/PMI should be transmitted in the same subframe, the CQI/PMI is not transmitted.

In Table 5, the transmission periodicity of the wideband CQI/PMI and the subband CQI is P and has the following properties.
  The wideband CQI/PMI has periodicity of H*P. At this time, H=J*K+1, wherein J denotes the number of BPs and K denotes the number of periodicities of the BP. That is, the UE performs transmission at {0, H, 2H, ... }.
  The CQI is transmitted at a time of J*K rather than when the wideband CQI/PMI is transmitted.

In Table 5, the transmission periodicity of the RI is a multiple m of that of the wideband CQI/PMI and has the following properties.
  The offsets of the RI and the wideband CQI/PMI are 0 and, if the RI and the wideband CQI/PMI are transmitted in the same subframe, the wideband CQI/PMI is not transmitted.

Parameters P, H, K and O described in Table 5 are all determined at the higher layer of the UE and signaled to a physical layer of the UE.

Hereinafter, a feedback operation according to the mode of the UE will be described with reference to Table 5. If the UE is in Mode 1-0 and the RI is transmitted to the BS, the UE generates the RI with respect to the system bandwidth or the specified set S and transmits Type 3 report for transmitting the RI to the BS. If the UE transmits the CQI, the wideband CQI is transmitted.

If the UE is in Mode 1-1 and transmits the RI, the UE generates the RI with respect to the system bandwidth or the specified set S and transmits a Type 3 report for transmitting the RI to the BS. If the UE transmits the CQI/PMI, a single precoding matrix is selected in consideration of the recently transmitted RI. That is, the UE transmits a type 2 report composed of a wideband CQI, a single precoding matrix and a differential wideband CQI to the BS.

If the UE is in Mode 2-0 and transmits the RI, the UE generates the RI with respect to the system bandwidth or the specified set S and transmits a Type 3 report for transmitting the RI to the BS. If the UE transmits the wideband CQI, the UE generates the wideband CQI and transmits a Type 4 report to the BS on the assumption of the recently transmitted RI. If the UE transmits the CQI for the selected subband, the UE selects a most preferred subband with respect to J BPs composed of N subbands and transmits a Type 1 report to the BS. The type 1 report may be transmitted via one or more subframes according to the BP.

If the UE is in Mode 2-1 and transmits the RI, the UE generates the RI with respect to the system bandwidth or the specified set S and transmits a Type 3 report for transmitting the RI to the BS. If the UE transmits the wideband CQI to the BS, the UE generates the wideband CQI and transmits a Type 4 report to the BS in consideration of the recently transmitted RI. If the CQI for the selected subbands is transmitted, the UE generates a difference between a single CQI value for the selected subbands in the BP in consideration of the recently transmitted PMI/RI and a CQI of a codeword on the assumption that a single precoding matrix is used for the selected subbands and the recently transmitted RI if the RI is greater than 1 with respect to J BPs composed of Nj subbands and transmits a Type 1 report to the BS.

CoMP (Coordinated Multiple Point Transmission and Reception)

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple Rx points) is referred to as UL CoMP, and the other case in which there are multiple DL points (i.e., multiple Tx points) is referred to as DL CoMP.

Figure 5:
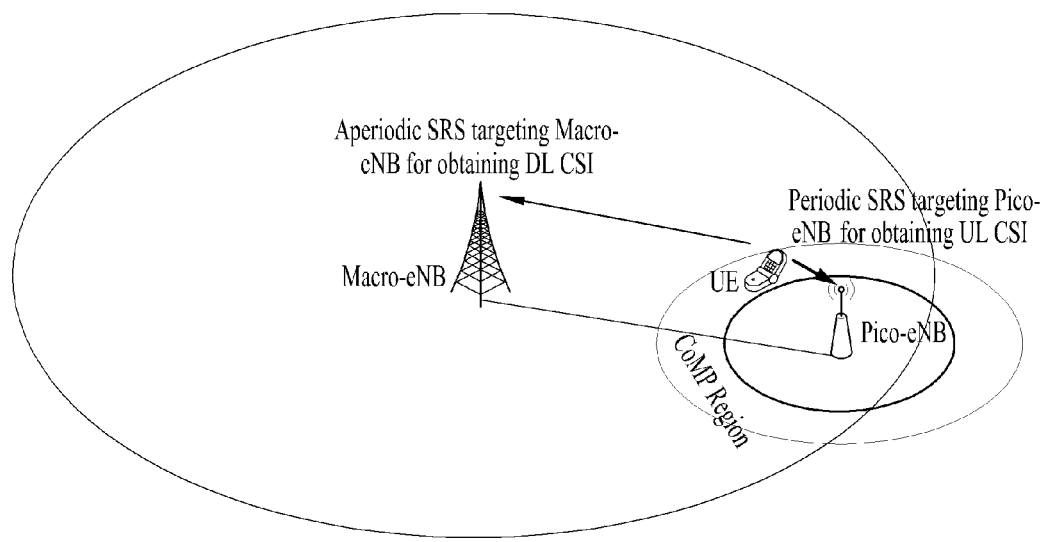
FIG. 5 is a conceptual diagram illustrating a wireless communication environment according to the embodiments of the present invention.

FIG. 5 is a conceptual diagram illustrating a wireless communication environment according to the embodiments of the present invention. In FIG. 5, a user equipment (UE) can communicate with two points, for example, a macro-eNB and a poci-eNB. Although this communication scheme may be referred to as CoMP as an example, the scope or spirit of the present invention is not limited thereto. In FIG. 5, a macro-eNB target SRS for obtaining DL CSI is transmitted in the form of aperiodic SRS (A-SRS), and a pico-eNB target SRS for obtaining UL CSI is transmitted in the form of a periodic SRS (P-SRS). If the UE (hereinafter referred to as CoMP UE) shows UL-heavy traffic, it may be preferable that frequent UL transmission be achieved toward a nearby pico-eNB, the pico-target SRS for UL CSI acquisition is aperiodically transmitted to support frequent UL transmission toward the nearby pico-eNB, so that the corresponding PUSCH link adaptation is facilitated. In other words, assuming that the DL-heavy traffic situation is not given, the macro-eNB target SRS for DL CSI acquisition may sufficiently obtain the DL CSI because it performs A-SRS format transmission based on intermittent aperiodic triggering whenever the DL buffered data exists. However, the scope or spirit of the present invention is not limited to the example in which the macro-eNB target SRS is aperiodically transmitted and the pico-eNB target SRS is periodically transmitted.

1. First Example

Meanwhile, in the communication environment of FIG. 5, the UE for use in a first embodiment may inform the eNB of a Tx power value regarding specific SRS transmission. For example, if the UE transmits SRS for acquiring DL CSI in the same communication environment as in FIG. 5, the UE may inform the eNB of not only SRS but also a Tx power value regarding the corresponding SRS.

In case of LTE-A TDD, only a channel quality indicator (CQI) from among CRS report information may be reported. That is, RI and PMI reporting may be omitted. Since the DL channel state is identical to the UL channel state (or the DL channel state is almost identical to the UL channel state) due to TDD characteristics, the eNB can estimate the RI and the PMI through SRS transferred from the UE to the eNB. However, since it is impossible to calculate a channel gain through SRS, CQI should still be reported by the LTE-A TDD system.

As described above, if the SRS Tx power value is signaled to the eNB, the channel pathloss from the UE can be measured through the SRS Tx power value provided when at least one eNB or at least two eNBs receive the SRS. As a result, eNB(s) can measure a channel gain between UE and the eNB(s), such that the eNB(s) may establish not only a power level for PDSCH transmission but also an MCS level. That is, through notification of the SRS Tx power value according to an embodiment of the present invention, CQI report may be omitted, so that the amount of resources allocated to the UE for CQI calculation, processing load, power use, etc. can be reduced.

A method for allowing the UE to inform the eNB of a Tx power value of the corresponding SRS during the SRS transmission may be used when PUSCH transmits a Tx power value of the SRS dependent on a specific time. The above-mentioned description is only exemplary, and it should be noted that technology proposed by the present invention conceptually includes various modifications in which the above information is transmitted in various formats through an uplink channel or another container other than PUSCH. As such, general schemes thereof will hereinafter be described in detail.

1-1. When the UE transmits a PUSCH (or when the UE transmits data through another container or another UL channel), the Tx power value of the latest transmitted SRS (or SRS to be transmitted at a specific time or SRS having been transmitted at a specific time) may be contained in the PUSCH and then transmitted.

As a representative method for indicating the above specific time, the specific time may be signaled through various higher layer signals, or may be indicated through a DCI format in which a UL grant for the PUSCH occurs. The above indication may be performed using a specific bit of the corresponding DCI, and this operation may be carried out by addition of additional bit(s). If the specific time is a future time point, the UE must transmit the SRS using the Tx power value of SRS transmitted over a current PUSCH at the above specific time.

In addition, the above specific time may also be referred to as a subframe index. For example, the above specific time may be indicated through an integer value $K_{offset}$ indicating an offset on the basis of a subframe index (n) at which the PUSCH is transmitted. For example, $K_{offset}$ is an integer selected from among −5 to +5, and may be indicated through a higher layer signal or a specific bit of a DCI format.

1-2. Alternatively, PUSCH configured to transmit the Tx power value of the SRS may be configured to be transmitted at the same subframe as in the SRS. That is, the SRS and the Tx power value of the SRS may be transmitted at the same subframe. For example, assuming that the SRS is transmitted at the last SC-FDMA symbol of one subframe, PUSCH is transmitted through a previous SC-FDMA symbol of the last SC-FDMA symbol, and the SRS Tx power value may be contained in the PUSCH and then transmitted. In addition, the Tx power value of another SRS may be additionally transmitted. For this purpose, the SRS sequence information or ID information of a target TP may be applied to the UE.

1-3. Transmission of the SRS Tx power value may be semi-statically or dynamically configured. For example, the SRS Tx power value may be semi-statically configured to be transmitted in specific subframe(s) at which PUSCH is transmitted through various higher layer signals.

In accordance with the above-mentioned dynamic configuration method, the above specific subframe(s) may be indicated through a DCI in which a UL grant for the PUSCH occurs. The above indication may be carried out using specific bits contained in the corresponding DCI, and may also be performed by addition of additional bit(s). The SRS Tx power value may be used to obtain multiple DL CSIs for DL-CoMP using the Tx power value when information is shared between eNBs (or RRHs/points) so that a specific eNB (or RRH/point) receives the SRS and performs CSI measurement.

1-4. Meanwhile, the UE may transmit the SRS Tx power value, and the Tx power value of the UL signal or the Tx power value for UL transmission, for example, PUSCH/PUCCH DMRS or PUSCH/PUCCH Tx power value, to the eNB over a PUSCH or the like.

2. Second Example

In case of transmitting the SRS for DL CSI acquisition, if another TP for DL-CoMP intermittently requests transmission of the DL CSI acquisition SRS, the present invention provides a method for triggering transmission of the DL CSI acquisition SRS from another cell/TP instead of a DL serving cell. That is, UL-associated DCI may be transmitted from another cell/TP instead of the DL serving cell to the UE. In other words, the UL-associated DCI and the DL-associated DCI may be received from different cells/TPs.

More specifically, some parts (e.g., UL-associated DCI format(s), or DL-associated DCI format(s)) from among DL formats, that are received from the DL serving cell through a PDCCH, may be transmitted from other cell(s)/TP(s) instead of the DL serving cell. The UE may receive information/parameter(s) (i.e., cell ID information related to the corresponding cell/TP(s)) for decoding a PDCCH, that is transmitted from the corresponding cell/TP(s), through a higher layer signal. In addition, since a specific activation parameter exists, the specific operation in which the DCI format(s) are received from the cell(s)/TP(s) instead of the DL serving cell can be activated from a specific time (e.g., subframe(s) of a specific index). Additionally or alternatively, when this specific activation parameter is transferred through RRC signaling, information/parameter(s) (e.g., cell ID information of the corresponding cell/TP(s)) for decoding a PDCCH transmitted from the corresponding cell/TP(s) may be transmitted to the UE through higher layer signaling in advance.

From the activation time of the above operation, the UE must perform blind decoding (BD) for the above specific DCI format(s) (e.g., UL-associated DCI format(s)) within a PDCCH search space (SS) of the PDCCH of the corresponding cell/TP(s) using cell ID information segment(s) of the corresponding cell/IP(s) configured by RRC, and the UE must also perform BD of other DCI format(s) (e.g., DL-associated DCI format(s)) other than the specific DCI format(s) in a PDCCH SS of a current DL serving cell. That is, the UE must perform BD for DCI format(s) in a PDCCH SS of the DL serving cell, and at the same time must perform BD for DCI format(s) in a PDCCH SS of other RRC-configured cells/TP(s).

2-1. As shown in the above example, if a target UL point (i.e., RP) of a specific UE is different from a DL point (i.e., TP), the Tx power value of the DL CSI acquisition SRS transmitted to the DL point may be indicated through a PUSCH for the UL point. For example, when UL PUSCH is transmitted to a nearby pico-eNB under the same situation as in FIG. 5, the Tx power value of the DL CSI acquisition SRS may be contained in the UL PUSCH and the resultant UL PUSCH may be transmitted.

In more detail, the macro eNB corresponding to the serving cell may transmit UL-associated DCI (i.e., PUSCH scheduling information and SRS triggering information) to the UE. In this case, the PUSCH scheduling information may schedule PUSCH transmission to the pico-eNB instead of the macro-eNB, and the above SRS triggering may schedule SRS transmission to the macro-eNB. The pico-eNB corresponding to the non-serving cell may receive the PUSCH from the UE according to the PUSCH scheduling information. In this case, the SRS Tx power value is contained in the PUSCH, so that the resultant PUSCH can be transmitted to the pico-eNB.

The SRS Tx power value is contained in a specific message format of the corresponding PUSCH so that the resultant message is multiplexed with PUSCH data and then transmitted. That is, according to an example of this specific message format, the corresponding SRS configuration information (for example, a scrambling seed value (i.e., an initialization value of a pseudo-random sequence for generating the SRS sequence) for generating the corresponding SRS sequence) may be loaded and transmitted. As a result, the presence of the SRS Tx power value based on the above configuration can be recognized. That is, general UL data is loaded on a PUSCH, and specific signature information indicating inclusion of the specific SRS Tx power value is contained in the SRS configuration information. As a result, if the corresponding signature information is detected by the eNB, the corresponding specific message format may be defined in advance in the form of an engaged password signature so that the UE and the eNB can recognize that the next data information indicates the SRS Tx power value.

2-2. Tx power value of the DL CSI acquisition SRS applied to the UL point may be applied to specific TP(s) contained in the DL-CoMP aggregate, that requires the SRS Tx power value, through a communication line in which little time delay is generated through an X2 interface or optical fiber. Specific TP(s) of the corresponding DL-CoMP aggregate having received the SRS Tx power value may estimate the channel pathloss between the corresponding UE and the TP using the above Tx power value, and a channel gain is measured through the estimation result, so that the MCS level and appropriate power level may be established during the PDSCH transmission based on a specific DL-CoMP format (e.g., dynamic point selection, coordinated scheduling/beamforming, joint transmission, and the like).

2-3. There may be two or more Tx power values of a specific SRS indicated through PUSCH transmission to the UL point. Each SRS Tx power value may be a Tx power value of a specific moment corresponding to each SRS transmission based on different power control (PC) processes. For example, under the environment in which the UL point is different from the DL point as in FIG. 5, it may be possible to indicate the Tx power value of the SRS that is operated at a specific time spaced apart from a power control (PC) value of PUSCH applied to the UL point by a constant value ($P_{SRS\_offset}$). In addition, when the DL CSI acquisition SRS follows another separated PC process, it may also be possible to indicate the Tx power value of the corresponding SRS.

That is, if several SRS Tx power values are attempted to be indicated through a PUSCH, the designated/allocated process IR or number (or unique ID information such as cell ID information of a specific RP) per PC process of each SRS may be assigned in advance, and the corresponding ID or number is signaled so that the Tx power value of a certain SRS can be recognized.

2-4. In accordance with a method for allowing the eNB to perform triggering in a manner that PUSCH including Tx power value(s) of a specific SRS is transmitted, a (special) UL grant for the above triggering may be received from the cell/TP instead of the serving cell (e.g., DL serving cell). That is, for the above-mentioned operation, in order to transmit a DCI format such as the special UL grant by the cell/TP instead of the DL serving cell, information/parameter(s) for decoding the PDCCH from the cell/TP(s) capable of generating the corresponding special UL grant must be transferred to the corresponding UE in advance, wherein the information/parameter(s) may include ID-associated information (e.g., a physical cell ID) of the cell/TP(s). A method for employing the higher layer signal (e.g., RRC signaling) may be achieved using the above-mentioned transmission scheme.

2-5. The embodiments of the present invention can be applied to the above-mentioned SRS, a Tx power value of the UL signal, and a Tx power value for UL transmission. For example, the embodiments of the present invention can be applied to, for example, PUSCH/PUCCH DMRS or PUSCH/PUCCH Tx power values. For reference, the UL signal transmission or the UL transmission may be used to configure, for example, eIMTA (enhanced Interference Management and Traffic Adaptation) or different UL/DL configurations.

3. Third Example

The operations described in this embodiment may be performed when a UE is connected to the DL or UL serving cell corresponding to one cell/TP and only UL handover is independently performed. That is, the UL-associated DCI format(s) may be received from cells/TPs different from the cell(s)/TP(s) through which DL-associated DCI format(s) are transmitted due to the above UL handover. In other words, assuming that DL-associated DCI format(s) are still received from the DL serving cell, DL handover does not occur. Under the above-mentioned operations, all operations related to handover may also be performed. In contrast, if the UE is connected to the DL and UL serving cells corresponding to one cell/TP and only handover is independently performed, DL-associated DCI format(s) may be received from other cells/TPs.

4. Fourth Example

The above-described first to third embodiments of the present invention may be independently applied or two or more embodiments thereof may be simultaneously applied.

Figure 6:
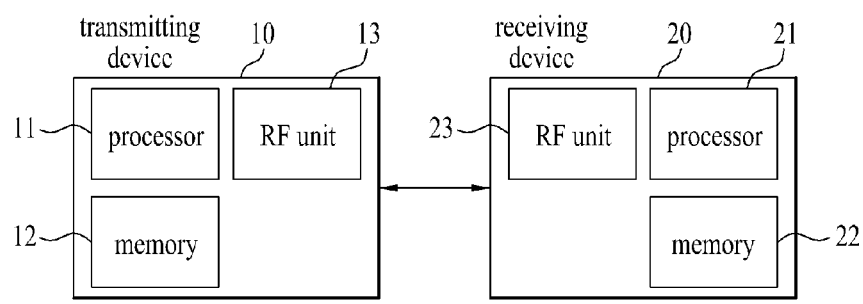
FIG. 6 is a block diagram illustrating a radio frequency (RF) device according to an embodiment of the present invention.

FIG. 6 is a block diagram of a transmitting device 10 and a receiving device 20 configured to implement exemplary embodiments of the present invention.

Referring to FIG. 6, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency downconverts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 in downlink. In embodiments of the present invention, an eNB serves as the receiving device 20 on uplink and as the transmission device 10 in downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention is applicable to a wireless communication device such as a user equipment (UE), base station (BS), or other devices.

What is claims:

1. A method for transmitting an uplink signal by a user equipment (UE) served by a plurality of base stations in a Time Division Duplex (TDD) wireless communication system, the method comprising:
   receiving, by the UE from a first one of the plurality of base stations, a first downlink control signal which triggers the UE to transmit an uplink reference signal and triggers the UE to transmit, to a second one of the plurality of base stations, an uplink data channel including a transmission power value of the uplink reference signal;
   transmitting, by the UE, the uplink reference signal based on uplink-associated control information contained in the first downlink control signal; and
   transmitting, by the UE to the second base station, the uplink data channel including the transmission power value, wherein the transmission power value is shared between the first base station and the second base station, and is used for at least one of the first and second base stations to obtain a downlink channel gain between the UE and the at least one of the first and second base stations, and
   wherein the uplink data channel further includes signature information that is followed by the transmission power value.

2. The method according to claim 1, wherein the transmission power value is transmitted in a same uplink subframe in which the uplink reference signal is transmitted.

3. The method according to claim 1, wherein the uplink reference signal is a sounding reference signal (SRS).

4. A method for receiving an uplink signal in a Time Division Duplex (TDD) wireless communication system in which a user equipment (UE) is served by a plurality of base stations, the method performed by a first one of the plurality of base stations and comprising:
   transmitting, by the first base station to the UE, a downlink control signal which triggers the UE to transmit an uplink reference signal and triggers the UE to transmit, to a second one of the plurality of base stations, an uplink data channel including a transmission power value of the uplink reference signal;
   receiving, by the first base station from the UE, the uplink reference signal based on the uplink-associated control information contained in the downlink control signal; and
   receiving, by the first base station from the second base station, the transmission power value used for at least one of the first and second base stations to obtain a downlink channel gain between the UE and the at least one of the first and second base stations,
   wherein the uplink data channel further includes signature information that is followed by the transmission power value.

5. The method according to claim 4, wherein the transmission power value is received in a same uplink subframe in which the uplink reference signal is received.

6. The method according to claim 4, further comprising:
   measuring a downlink channel gain using the received transmission power value.

7. The method according to claim 4, wherein the uplink reference signal is a sounding reference signal (SRS).

8. A user equipment (UE) device configured to transmit an uplink signal in a Time Division Duplex (TDD) wireless communication system in which a plurality of base stations serve the UE, the UE device comprising:
   a radio frequency (RF) unit; and
   a processor configured to control the RF unit to:
   receive, from a first one of the plurality of base stations, a first downlink control signal which triggers the UE to transmit an uplink reference signal and triggers the UE to transmit, to a second one of the plurality of base stations, an uplink data channel including a transmission power value of the uplink reference signal,
   transmit the uplink reference signal based on uplink-associated control information contained in the first downlink control signal, and
   transmit, to the second base station, the uplink data channel including the transmission power value, wherein the transmission power value is shared between the first base station and the second base station, and is used for at least one of the first and second base stations to obtain a downlink channel gain between the UE and the at least one of the first and second base stations, and wherein the uplink data channel further includes signature information that is followed by the transmission power value.

9. The UE device according to claim 8, wherein the transmission power value is transmitted in a same uplink subframe in which the uplink reference signal is transmitted.

10. The UE device according to claim 8, wherein the uplink reference signal is a sounding reference signal (SRS).

11. A first base station (BS) device configured to receive an uplink signal in a Time Division Duplex (TDD) wireless communication system in which a plurality of BS devices including at least the first BS device and a second BS device serve a user equipment (UE), the first BS device comprising:
   a radio frequency (RF) unit; and
   a processor configured to control the RF unit to:
   transmit, to the UE, a downlink control signal which triggers the UE to transmit an uplink reference signal and triggers the UE to transmit, to the second BS device, an uplink data channel including a transmission power value of the uplink reference signal,
   receive, from the UE, the uplink reference signal based on uplink-associated control information contained in the downlink control signal, and
   receive, from the second BS device, the transmission power value which is used for at least one of the first and second BS devices to obtain a downlink channel gain between the UE and the at least one of the first and second BS devices,
   wherein the uplink data channel further includes signature information that is followed by the transmission power value.

12. The first BS device according to claim 11, wherein the transmission power value is received in a same uplink subframe in which the uplink reference signal is received.

13. The first BS device according to claim 11, wherein the processor is further configured to measure a downlink channel gain using the transmission power value.

14. The first BS device according to claim 11, wherein the uplink reference signal is a sounding reference signal (SRS).

15. The method according to claim 1, wherein the uplink data channel further includes a plurality of transmission power values of uplink reference signals for different power control processes.

16. The method according to claim 1, further comprising:
   receiving parameters to be used for decoding a second downlink control signal transmitted from the second base station, wherein the received parameters are used when a transmission of the second downlink control signal is activated, which triggers the UE to transmit the uplink reference signal and triggers the UE to transmit the uplink data channel including the transmission power value of the uplink reference signal; and
   blind decoding the second downlink control signal transmitted from the second base station using the received parameters after the transmission of the second downlink control signal is activated.

17. The method according to claim 4, wherein the uplink data channel further includes a plurality of transmission power values of uplink reference signals for different power control processes.

18. The UE device according to claim 8, wherein the uplink data channel further includes a plurality of transmission power values of uplink reference signals for different power control processes.

19. The UE device according to claim 8, wherein the processor is further configured to:
   receive parameters to be used for decoding a second downlink control signal transmitted from the second base station, wherein the received parameters are used when a transmission of the second downlink control signal is activated, which triggers the UE to transmit the uplink reference signal and triggers the UE to transmit the uplink data channel including the transmission power value of the uplink reference signal; and
   blind decode the second downlink control signal transmitted from the second base station using the received parameters after the transmission of the second downlink control signal is activated.

20. The first BS device according to claim 11, wherein the uplink data channel further includes a plurality of transmission power values of uplink reference signals for different power control processes.

* * * * *